(12) United States Patent
Coronado

(10) Patent No.: US 7,739,853 B2
(45) Date of Patent: Jun. 22, 2010

(54) CONSTRUCTION MODULE ARRANGEMENT

(76) Inventor: Hector Coronado, 10724 Wilshire Blkvd, Suite 607, Los Angeles, CA (US) 90024

( * ) Notice: Subject to any disclaimer, the term of this patent is extended or adjusted under 35 U.S.C. 154(b) by 1448 days.

(21) Appl. No.: 10/813,744

(22) Filed: Apr. 1, 2004

(65) Prior Publication Data

US 2005/0247025 A1    Nov. 10, 2005

(51) Int. Cl.
*E04B 1/38* (2006.01)
*E04C 2/54* (2006.01)
*E04C 2/34* (2006.01)

(52) U.S. Cl. .................. 52/698; 52/796.1; 52/782.1; 52/784.16; 52/795.1; 52/783.1

(58) Field of Classification Search .................. 52/698, 52/796.1, 782.1, 784.16, 795.1, 783.1, 784.1, 52/794.1, 455, 404.1, 407.1, 407.2, 407.5, 52/220.8, 503, 504, 576
See application file for complete search history.

(56) References Cited

U.S. PATENT DOCUMENTS

| 2,661,511 | A | * | 12/1953 | Weyerhaeuser | 52/561 |
| 2,893,907 | A | * | 7/1959 | Bove | 52/309.1 |
| 3,548,559 | A | * | 12/1970 | Reville, Jr. et al. | 52/782.1 |
| 3,755,053 | A | * | 8/1973 | Lindahl | 428/81 |
| 5,439,749 | A | * | 8/1995 | Klasell et al. | 428/537.1 |
| 6,029,419 | A | * | 2/2000 | Kimura | 52/796.1 |
| 6,253,527 | B1 | * | 7/2001 | De Zen | 52/745.05 |
| 6,482,496 | B1 | * | 11/2002 | Wycech | 428/71 |
| 6,667,108 | B2 | * | 12/2003 | Ellstrom | 428/537.1 |
| 6,860,082 | B1 | * | 3/2005 | Yamamoto et al. | 52/794.1 |
| 2005/0142369 | A1 | * | 6/2005 | Canady et al. | 428/503 |

* cited by examiner

*Primary Examiner*—Richard E Chilcot, Jr.
*Assistant Examiner*—Mark R Wendell
(74) *Attorney, Agent, or Firm*—Kleinberg & Lerner, LLP; Marvin H. Kleinberg

(57) ABSTRACT

A construction module having a multi-layered top panel, a multi-layered intermediate panel and a multi-layered bottom panel which are bonded together and desired cavities are provided through one or more of the top panel, intermediate panel and bottom panel.

19 Claims, 5 Drawing Sheets

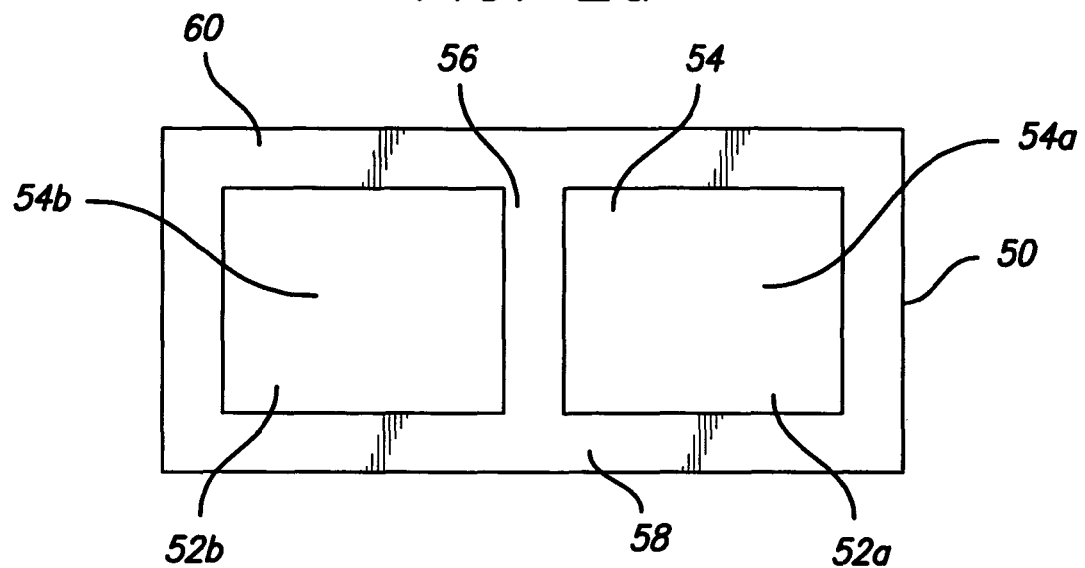
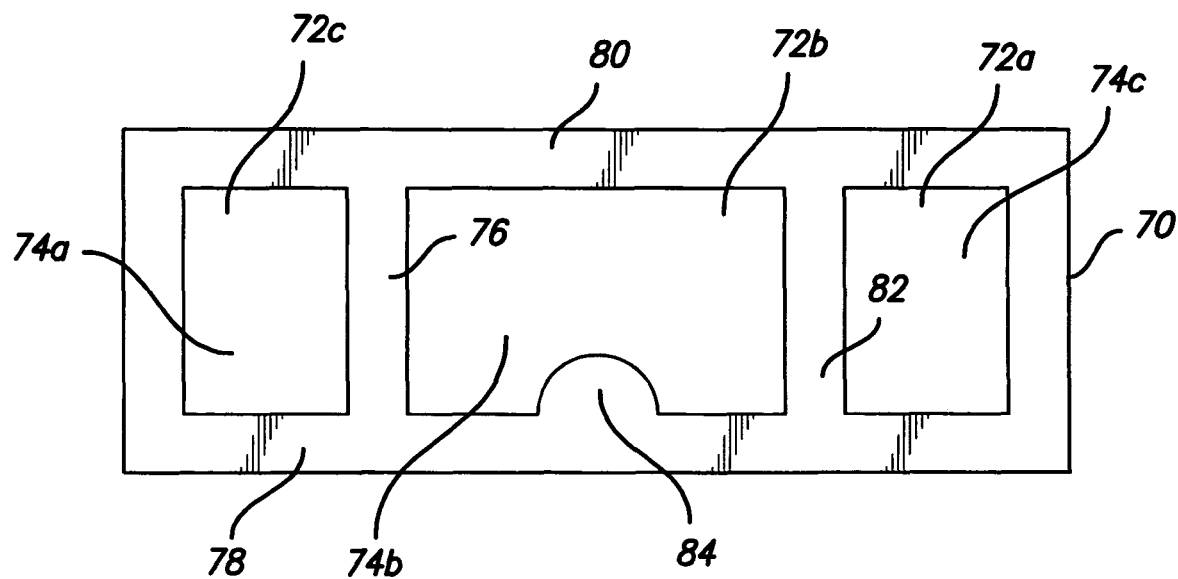

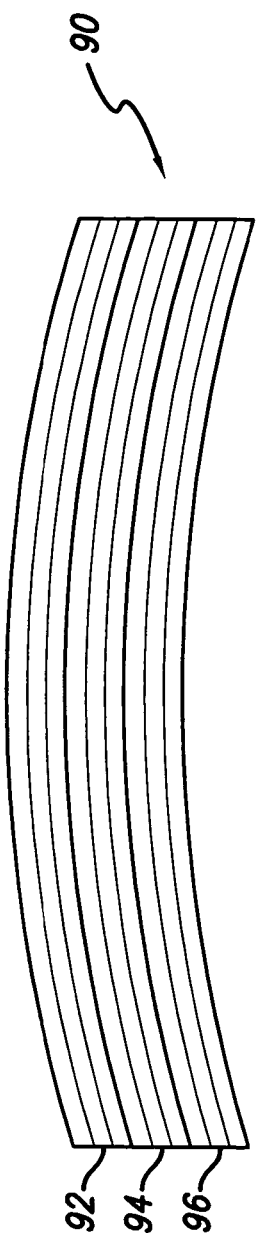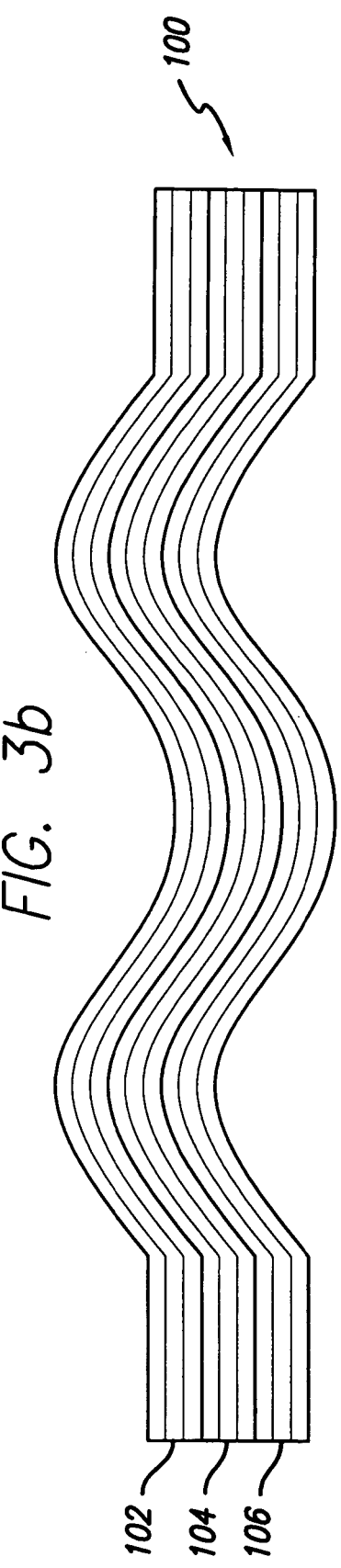
FIG. 3a
FIG. 3b

CONSTRUCTION MODULE ARRANGEMENT

BACKGROUND OF THE INVENTION

1. Field of the Invention

This invention relates to the construction art and more particularly to an improved construction module and the method of making the improved construction module.

2. Description of the Prior Art

Construction modules have long been utilized in a variety of applications such as for walls, doors, cabinets, drawer fronts, counter tops and the like. In some applications, such as aircraft, recreational vehicles and similar structures, it is desired that the modules be as light weight as possible and still strong and rigid enough to be suitable for the intended purpose. Further, such modules are often required to be visually attractive so as to provide an appealing combination with the other decor in the structure. Additionally, it is, of course, desired that the construction module be economical to purchase by the end user and therefore be econmical to fabricate so that the lower cost is passed on to the customer.

In many such applications there have heretofore been utilized construction modules fabricated from metal coated honeycomb, corrugated aluminum, aluminum skin over ribs or dividers, thin plywood and other such constructions. While many of these modules were light weight, they often were not rigid enough or strong enough for the purpose for which they were intended. Such lack of rigidity or strength often caused distortion of the panel when used for the intended purpose. Also, many of these prior art modules were not visually attractive from all aspects from which they were viewed. For example, even though a decorative cover could be placed on the exterior and/or interior surfaces of such structures such as doors, drawer fronts, cabinet walls and the like which are often viewed from both sides, the edge portions thereof were not as attractive as often desired. Also, many of the prior art construction modules were relatively expensive to the end user, thereby limiting the use thereof.

Thus, there has long been desired a construction module that is light weight, rigid, strong and visually attractive on all surfaces thereof and economical in cost.

SUMMARY OF THE INVENTION

Accordingly, it is an object of the present invention to provide an improved construction module.

It is another object of the present invention to provide an improved construction module that is light in weight, strong and rigid.

It is another object of the present invention to provide an improved construction module that is economic to fabricate and economic for purchase by the end user.

It is yet another object of the present invention to provide an improved construction module that can be provided with a visually attractive appearance on all surfaces thereof.

It is yet another object of the present invention to provide an economical method of fabricating a light weight, rigid, strong and visually attractive construction module.

The above, and other objects of the present invention are achieved, in a first preferred embodiment, by providing three panels which, for convenience in description, are designated as a top panel, an intermediate panel and a bottom panel. Each of the three panels is comprised of a plurality of thin sheet wooden laminate layers bonded together. A portion of the intermediate panel has been removed to define a cavity extending therethrough and the cavity is bounded by peripheral wall members thereof. The number of laminate layers in each panel may be the same or the number of laminate layers in each panel may be different depending on the application. For convenience of description, the embodiments of the present invention described herein are provided with the three panels each having three laminate layers. In fabricating the construction module of the present invention more or less than three laminate layers may be utilized in each of the panels as may be desired for particular applications. Each of the laminate layers may be, for example, on the order of one eighth inch thick, though a greater thickness or a smaller thickness may be used as desired for particular applications.

Each of the top panel and bottom panel has an outer surface and an inner surface and the intermediate panel has an upper surface and a lower surface. After the desired portion of the intermediate panel has been removed to define the cavity therein, the inner surface of the top panel is affixed to the upper surface of the intermediate panel and the inner surface of the bottom panel is affixed to the lower surface of the intermediate panel to provide the construction module. If desired, the outer surface of the top panel and/or the outer surface of the bottom panel may be provided with thin veneer layer replicating a wood grain or any other desired visually attractive configuration. The side surfaces of the top panel, intermediate panel and bottom panel may be left in the natural state as this appearance is often considered visually attractive or such surfaces may also be provided with a veneer layer or any other desired visually attractive configuration. The construction module of this first preferred embodiment of the present invention is a hollow core construction module thereby combining the desired light weight with a strong and rigid construction that is also visually attractive and economical to fabricate. The peripheral edges of the construction module provide a strong support for the attachment of hinges, handles or the like as necessary in main installations. The shape of the cavity in the intermediate panel may be varied as desired for particular applications. For example, in the applications wherein the construction module of the first embodiment of the present invention may be utilized as a door, an enlarged portion of the intermediate panel may be left intact in regions adjacent a peripheral edge to provide a proper mounting region for a conventional door handle to be mounted therein In another preferred embodiment of the present invention, which is similar to the first preferred embodiment, the cavity in the intermediate panel may be in two portions and the two portions separated by a transverse member left intact and extending between peripheral edges. The transverse member may be positioned at any desired location in the intermediate panel to accommodate any desired attachment that may be required in particular applications.

In a second preferred embodiment of the present invention, a top panel, an intermediate panel, and a bottom panel are provided and may be the same as the top panel, intermediate panel and bottom panel, described above. However, in this second preferred embodiment, a preselected portion of each of the top panel and the bottom panel is also removed to define cavities extending therethrough as well as removal of a preselected portion of the intermediate panel to define the cavity extending therethrough. The cavities in the top panel, intermediate panel, and bottom panel are placed in an aligned array to provide a cavity extending through the entire construction module. A transparent member such as a pane of glass may be placed in the aligned cavity array to allow visual perception through the construction module. Alternatively, depending upon the application of the construction module, an entire window assembly may be mounted in the aligned cavity array.

In a third preferred embodiment of the present invention, a top panel, an intermediate panel and a bottom panel are provided and may be the same as the top panel, intermediate panel and bottom panel described above. In this third embodiment one or more portions of the top panel and/or the bottom panel are removed to provide cavities therethrough. The upper surface and/or the lower surface of the intermediate panel is provided with a decorative covering in preselected portions thereof. The decorative covering may be a fabric, a coat of paint or any other desired visually attractive configuration. The top panel and the bottom panel are attached to the intermediate panel in an aligned position so that the decorative covering on the upper surface and/or the lower surface of the intermediate panel are aligned with the cavities in the top panel and/or the bottom panel to allow viewing of the decorative covering.

The fabrication of the construction module of the present invention may be accomplished in a preferred method according to the principles of the present invention. The first plurality of thin sheet laminate layers in the top panel are provided with a heat activated glue therebetween. The second plurality of thin sheet laminate layers of the bottom panel are provided with a heat activated glue therebetween and the third plurality of thin sheet laminate layers of the intermediate panel are provided with a heat activated glue therebetween. The top panel and the bottom panel are positioned in the desired location on the intermediate panel and the assembly of the three panels are placed into a heated press. The press may be of any desired contour for forming the construction module into any preselected configuration. The press and the final construction module may be flat, curved, or contoured in any desired arrangement. The press is energized and activates the adhesive between the layers of each of the top panel, the intermediate panel and the bottom panel as well as forms the panels into the desired contour configuration.

The three layers are then removed from the press and the appropriate cavities are cut into the desired layers. After removal of the selected portions from the selected layers to define the desired cavities therein, a heat activated adhesive is applied to the inner surface of the top panel and the inner surface of the bottom panel and/or the upper and/or lower surface of the intermediate panel. The three panels are again assembled and aligned as desired and placed back into the press and the press again energized to activate the adhesive and bond the three layers together to form the construction module. The construction module may be trimmed at the peripheral edges thereof to provide the desired final configuration.

BRIEF DESCRIPTION OF THE DRAWING

The above and other objects of the present invention as incorporated into the preferred embodiments may be more fully understood from the following detailed description taken together with the accompanying drawing wherein similar reference characters refer to similar elements throughout and in which:

FIGS. 2A and 2B illustrate intermediate panels useful in the first preferred embodiment of the present invention;

FIGS. 3A and 3B illustrate contours into which the construction module of the present invention may be formed;

DESCRIPTION OF THE PREFERRED EMBODIMENTS

Figure 1:
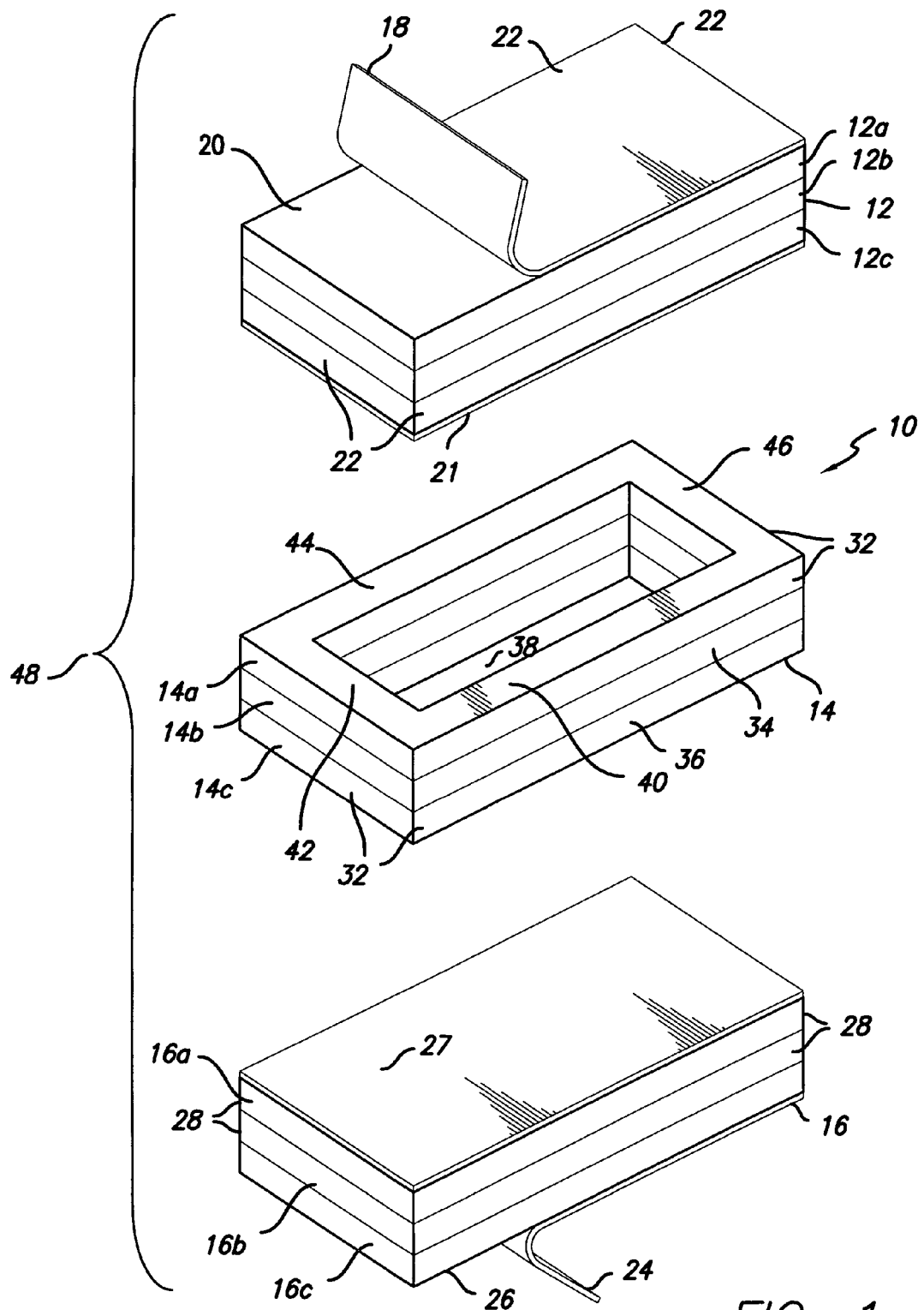
FIG. 1 is an exploded view of a preferred embodiment of a construction module according to the principles of the present invention.

Referring now to the drawing, there is illustrated in FIG. 1 a first preferred embodiment of the present invention generally designated 10. The embodiment 10 has a top panel 12, an intermediate panel 14 and a bottom panel 16. The top panel 12 is comprised of a first plurality of thin sheet laminate layers 12a, 12b and 12c bonded together by a suitable adhesive therebetween. Each of the thin sheet laminate layers may be a wood sheet and each may have a thickness on the order of one eighth of an inch. All of the first plurality of thin sheet laminate layers 12a, 12b and 12c are substantially coextensive. It is to be understood that the thickness of each of the first plurality of thin sheet laminate layers 12a, 12b and 12c may be selected as desired for particular applications and, additionally, may not all be the same thickness. Further, the number of the first plurality of thin sheet laminate layers may be greater than three or less than three as desired for particular applications. The illustration of three layers in the first plurality of thin sheet laminate layers is for illustrative purposes as is the thickness of one eighth of an inch thereof A decorative veneer layer 18 may be bonded to an outer surface 20 of the top panel 12, the top panel 12 also has peripheral edges 22 which, in embodiment 10, define a rectangular configuration. The top panel 12 also has an inner surface 21.

The bottom panel 16 is comprised of a second plurality of thin sheet laminate layers 16a, 16b and 16c bonded together by a suitable adhesive therebetween. Each of the thin sheet laminate layers 16a, 16b and 16c may be similar to the then sheet laminate layers 12a, 12b and 12c of the top panel 12 and may be a wood sheet and each layer, may have a thickness on the order of one eighth of an inch. All of the second plurality of thin sheet laminate layers 16a, 16b and 16c are substantially coextensive and, in embodiment 10, are coextensive with the top panel 12. It is to be understood that the thickness of each of the second plurality of thin sheet laminate layers 16a, 16b and 16c may be selected as desired for particular applications and, additionally, may not all be the same thickness. Further, the number of the second plurality of thin sheet laminate layers may be greater than three or less than three as desired for particular applications. The illustration of three layers in the second plurality of thin sheet laminate layers is for illustrative purposes as is the thickness of one eighth of an inch thereof.

A decorative veneer layer 24 may be bonded to an outer surface 26 of the bottom panel 16. The bottom panel 16 also has peripheral edges 28 which, in embodiment 10, define a rectangular configuration to match the rectangular configuration of the top panel 12.

The intermediate panel 14 is comprised of a third plurality of thin sheet laminate layers 14a, 14b and 142c bonded together by a suitable adhesive therebetween. Each of the third plurality of thin sheet laminate layers 14a, 14b and 14c may be similar to the layers 12a, 12b and 12c of top panel 12 and layers 14a, 14b and 14c of intermediate panel 14 and may be a wood sheet and each of the layers 14a, 14b and 14c may have a thickness on the order of one eighth of an inch. All of the third plurality of thin sheet laminate layers 14a, 14b and 14c are substantially coextensive with the top panel 12 and bottom panel 16. It is to be understood that the thickness of each of the third plurality of thin sheet laminate layers 14a, 14b and 14c may be selected as desired for particular applications and, additionally, may not all be the same thickness. Further, the number of the third plurality of thin sheet laminate layers may be greater than three or less than three as desired for particular applications. The illustration of three layers in the third plurality of thin sheet laminate layers is for illustrative purposes as is the thickness of one eighth of an inch thereof.

The intermediate panel 14 also has peripheral edges 32 which, in embodiment 10, define a rectangular configuration to match the rectangular configuration of the top panel 12 and bottom panel 16. The intermediate panel 14 has an upper surface 34 and a lower surface 36.

In embodiment 10 a preselected portion of the intermediate panel 14 has been removed to provide an intermediate panel cavity 38 extending therethrough and defining peripheral wall members 40, 42, 44 and 46 bounding the intermediate panel cavity 38.

The top panel 12, intermediate panel 14 and bottom panel 16 are joined together to provide the construction module 48. To join the top panel 12 to the intermediate panel 14, a layer of adhesive is applied between the inner surface 21 of the top panel 12 and the outer surface 40 of the intermediate panel 16. The bottom panel 16 is joined to the intermediate panel 14 by applying a layer of adhesive between the lower surface 36 of the intermediate panel 16 and the inner surface 27 of the bottom panel 16. The preferred process and method for bonding together all of the structure to form the construction module 48 according to the principles of the present invention is described below. After joining together the up 12, intermediate panel 14 and bottom panel 16 the peripheral edges may be trimmed to provide the desired peripheral configuration.

Referring now to FIG. 2 there is illustrated therein several alternate intermediate panels useful in the construction module 48 for various applications of the present invention. FIG. 2A shows a plan view of an intermediate panel 50 which may be fabricated in a manner generally similar to the manner of fabricating intermediate panel 14 described above. In the intermediate panel 50 there are two selected portions 52A and 52B of the intermediate panel 50 that are removed to define two cavity portions 54A and 54B defining the intermediate panel cavity 54 therethrough. The intermediate panel cavity portions 54A and 54B are separated by a transverse member 56 between the peripheral walls 58 and 60. Depending upon the particular applications for which the intermediate panel 50 may be utilized, the transverse member may provide additional support for a handle or knob (not shown) that may be desired to be attached thereto. The intermediate panel 50 may be bonded to a top panel such as top panel 12 described above and to bottom panel 16 in the manner as above described and as described below in connection with the description of the preferred process and method for fabricating a construction module such as construction module 48.

FIG. 2B shows a plan view of an intermediate panel 70 which may be fabricated in a manner generally similar to the manner of fabricating intermediate panel 14 described above. In the intermediate panel 70 there are three selected portions 72A, 72B and 72C of the intermediate panel 70 that are removed to define three cavity portions 74A, 74B and 74C defining the intermediate panel cavity 74 therethrough. The intermediate panel cavity portions 74A and 54B are separated by a first transverse member 76 between the peripheral walls 78 and 80. The intermediate panel cavity portions 74B and 74C are separated by a second transverse member 82 between the peripheral walls 78 and 80. Additionally, a supporting portion 84 may be left in the intermediate panel 70 to provide support for example, a door knob or door handle structure (not shown) that may be installed therein for the applications of a construction module utilizing the intermediate panel 70 in a door application. The intermediate panel 70 may be bonded to a top panel such as top panel 12 described above and to bottom panel 16 in the manner as above described and as described below in connection with the description of the preferred process and method for fabricating a construction module such as construction module 48.

The construction module 48 as described above ans as shown in the drawing is planar in contour. However, a construction module according to the principles of the present invention may be fabricated in any desired contour. FIG. 3A illustrates an edge elevational view of a construction module 90 having a top panel 92, an intermediate panel 94 and a bottom panel 96 fabricated in a manner as described above in connection with the embodiment 10 and formed into a curved contour. FIG. 3B illustrates an edge elevational view of a construction module 100 having a top panel 102, an intermediate panel 104 and a bottom panel 106 fabricated in a manner as described above in connection with the embodiment 10 and formed into a sinusoidal type contour. The contours illustrated in FIGS. 3A and 3B are only two of the many possible, contours that may be desired for particular applications of the present invention.

Figure 4:
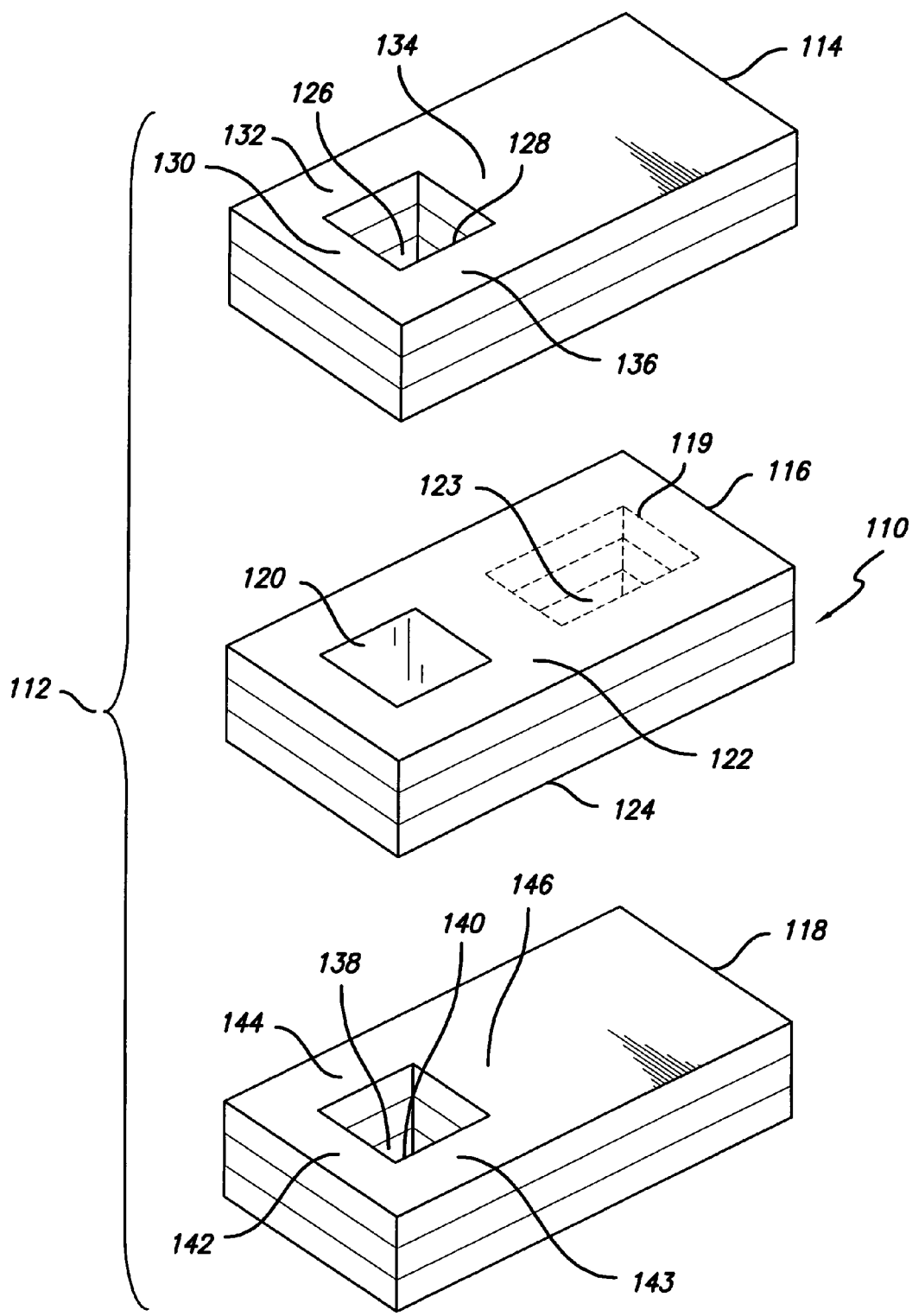
FIG. 4 illustrates another preferred embodiment of the present invention.

FIG. 4 illustrates an exploded view of another embodiment generally designated 110 of a construction module 112 according to the principles of the present invention. The embodiment 110 is generally similar to the embodiment 10 described above and is generally fabricated in the same manner and has a top panel 114, an intermediate panel 116 and a bottom panel 118. In the embodiment 110 a decorative layer 120 on a preselected portion of the upper surface 122. A similar decorative layer may be placed on the bottom surface 124. A preselected portion indicated by the dotted lines 119 may be removed to define intermediate panel cavity 123 therethrough to provide a lighter weight tot the construction module 112.

A preselected portion 126 of the top panel 114 is removed to define a top panel cavity 128 extending therethrough bounded by the top panel peripheral walls 130, 132, 134 and 136.

A preselected portion 138 of the bottom panel 118 is removed to define a bottom panel cavity 128 extending therethrough bounded by the bottom panel peripheral walls 142, 144, 146 and 148. The bottom panel cavity 140 is provided in those configurations of the present invention wherein a decorative layer on the bottom surface of the intermediate panel 116.

The top panel 114 is bonded to the intermediate panel 116 in a manner so that the top panel cavity 138 is aligned with the decorative layer 120 on the intermediate panel 116. Similarly, if a decorative layer is provided on the lower surface 124 of the intermediate panel 116, the bottom panel 118 is bonded to the intermediate panel 116 so that the bottom panel cavity 140 is aligned with the decorative layer on the lower surface 124 of th intermediate panel 116.

Figure 5:
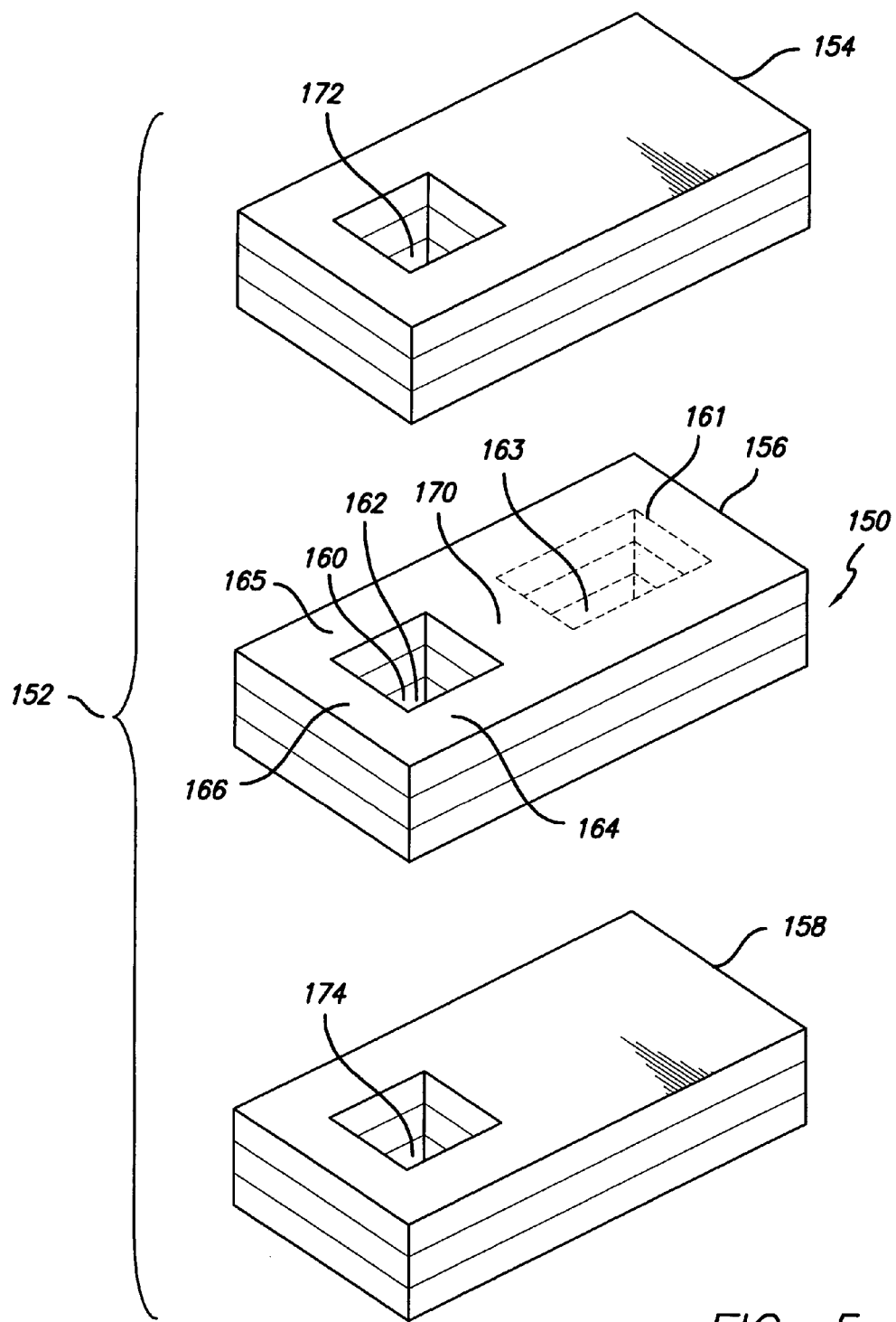
FIG. 5 illustrates another preferred embodiment of the present invention.

FIG. 5 illustrates an exploded view of another embodiment generally designated 150 of a construction module 152 according to the principles of the present invention. The embodiment 150 is generally similar to the embodiments 10 and 110 described above and is generally fabricated in the same manner and has a top panel 154, an intermediate panel 156 and a bottom panel 158. In the embodiment 150 a preselected portion 160 of the intermediate panel 156 is removed to define an intermediate panel cavity 162 therethrough bounded by the peripheral walls 164, 166, 168 and 170. Additionally, if desired, another preselected portion indicated by the dotted lines 161 may be removed to define a second intermediate panel cavity 1163 therethrough to provide a lighter weight tot the construction module 152.

The top panel 156 is generally similar to the top panel 114 of embodiment 110 and has a top panel cavity 172 extending therethrough. The bottom panel 158 is generally similar to the bottom panel 118 of embodiment 110 described above and has a bottom panel cavity 174 extending therethrough.

The top panel 154 is bonded to the intermediate panel 156 in a manner so that the top panel cavity 172 is aligned with the intermediate panel 162 on the intermediate panel 156. Similarly, the bottom panel 158 is bonded to the intermediate panel 156 so that the bottom panel cavity 174 is aligned with the intermediate panel cavity 162 of intermediate panel 116. A transparent member (not shown) may be placed in the aligned cavities 162, 172 and 174 to provided a window type configuration. Alternatively, depending upon the particular application for the construction module 152, an entire widow assembly may be mounted in the aligned cavities 162, 172 and 174.

The preferred method of fabricating the construction module of the present invention utilizes a heated, contoured press. According to this preferred method, a first plurality of thin sheet layers is assembled to form the top panel and a heat reactive adhesive is applied between the first plurality of thin sheet layers. If a veneer layer is desired it is applied to the outer surface of the top most layer and the heat reactive adhesive is applied therebetween. Similarly, a second plurality of thin sheet layers is assembled to form a bottom panel and a heat reactive adhesive is placed between the second plurality of thin sheet layers. If a veneer layer is desired, it is placed adjacent the lowest most layer and a heat reactive adhesive is placed therebetween. A third plurality of thin sheet layers is assembled to form an intermediate panel and a heat reactive adhesive is placed between the third plurality of thin sheet layers. The decorative layer, if required for the desired construction module is placed adjacent the uppermost layer of the intermediate panel and/or the lowest most layer of the intermediate panel and the heat reactive adhesive is placed therebetween The intermediate panel is placed between the top panel and the bottom panel in an aligned position as may be required by the structure of the particular construction module as described above. The aligned top panel, intermediate panel and bottom panel is placed in a heated press to bond together the first plurality of thin sheet layers, and to bind together the second plurality of thin sheet layers and to bond together the third plurality of thin sheet layers and form the top panel, intermediate panel and bottom panel into the desired contour. The top panel, intermediate panel and bottom panel are removed from said heated press and are separated from each other. The selected portions of each of the tp, intermediate panel and bottom panel are removed as desired depending on the particular construction module panel configuration and a heat reactive adhesive is placed between the inner surface of the top panel and the upper surface of the intermediate panel and a heat reactive adhesive is placed between the inner surface of the bottom panel and the lower surface of the intermediate panel. The assembled top panel, intermediate panel and bottom panel is placed back into the heated press to bond together the top panel, intermediate panel and the bottom panel to form the desired construction module. The construction module is removed from the heated press and the peripheral edges thereof may be trimmed as desired to the final configuration.

This concludes the description of the preferred embodiments of the present invention. From the above it can be seen that there has been described an improved light weight, strong and rigid construction module that may be finished to provide any desired visually attractive appearance.

While particular embodiments and applications of the present invention have been above described and illustrated, the present invention is not limited to the precise construction and arrangements disclosed. Those persons knowledgeable in the art may conceive of certain modifications, changes and variations in the detailed embodiments disclosed above as illustrative, to suit particular circumstances or products to be formed. The invention is therefore not intended to be limited to the preferred embodiments depicted, but only by the scope of the appended claims and the reasonably equivalent apparatus and methods to those defined therein.

The invention claimed is:

1. An improved construction module having a predetermined curvature comprising, in combination:
a top panel having an outer surface, and an inner surface, said top panel having a first plurality of thin sheet laminate layers of predetermined non-planar curvature bonded together for forming said top panel said top panel being adapted to completely cover an intermediate panel;
a bottom panel having an outer surface, and an inner surface, said bottom panel having a second plurality of thin sheet laminate layers of said predetermined curvature bonded together for forming said bottom panel, said bottom panel being adapted to completely cover an intermediate panel; and
an intermediate panel having an upper surface, a lower surface, and intermediate panel peripheral wall members defining an intermediate panel cavity therebetween, said intermediate panel cavity being completely enclosed by said top and bottom panels, said intermediate panel having a third plurality of thin sheet laminate layers bonded together in said predetermined curvature for forming said intermediate panel peripheral wall members.

2. The arrangement defined in claim 1 and further comprising: a decorative veneer layer having a said predetermined curvature on said outer surface of said top panel.

3. The arrangement defined in claim 1 and further comprising: a decorative veneer layer having said predetermined curvature on said outer surface of said bottom panel.

4. The arrangement defined in claim 1 and further comprising: a decorative veneer layer having said predetermined curvature on said outer surface of said top panel; and a decorative veneer layer having said predetermined curvature on said outer surface of said bottom panel.

5. The arrangement defined in claim 1 wherein: said inner surface of said top panel is bonded to said upper surface of said intermediate panel.

6. The arrangement defined in claim 1 wherein: said inner surface of said bottom panel is bonded to said lower surface of said intermediate panel.

7. The arrangement defined in claim 1 wherein: said inner surface of said top panel is bonded to said upper surface of said intermediate panel; and, said inner surface of said bottom panel is bonded to said lower surface of said intermediate panel.

8. The arrangement defined in claim 1 wherein: the number of said first plurality of thin sheet laminate layers in said top panel is the same as the number of said second plurality of thin sheet laminate layers in said bottom panel.

9. The arrangement defined in claim 1 wherein: the number of said first plurality of thin sheet laminate layers in said top panel is the same as the number of said third plurality of thin sheet laminate layers in said intermediate panel.

10. The arrangement defined in claim 1 wherein: the number of said first plurality of thin sheet laminate layers in said top panel is the same as the number of said second plurality of thin sheet laminate layers in said bottom panel, and the number of said third plurality of thin sheet laminate layers in said intermediate panel is the same as the number of said first plurality of thin sheet laminate layers in said top panel.

11. An improved construction module having a predetermined curvature comprising, in combination:

a top panel having an outer surface, and an inner surface, said top panel having a first plurality of thin sheet laminate layers having a first predetermined non-planar curvature pattern bonded together for forming said top panel said top panel being adapted to completely cover an intermediate panel;

a bottom panel having an outer surface, and an inner surface, said bottom panel having a second plurality of thin sheet laminate layers having said first predetermined curvature pattern bonded together for forming said bottom panel, said bottom panel being adapted to completely cover an intermediate panel; and an intermediate panel having an upper surface, a lower surface, and intermediate panel peripheral wall members defining an intermediate panel cavity therebetween, said intermediate panel cavity being completely enclosed by said top and bottom panels, said intermediate panel having a third plurality of thin sheet laminate layers bonded together in said first predetermined curvature pattern for forming said intermediate panel peripheral wall members, whereby said construction module maintains first predetermined curvature pattern to provide a non-planar surface.

12. The arrangement defined in claim 11 and further comprising: a decorative veneer layer having said first predetermined curvature pattern on said outer surface of said top panel.

13. The arrangement defined in claim 11 and further comprising: a decorative veneer layer having said first predetermined curvature pattern on said outer surface of said bottom panel.

14. The arrangement defined in claim 11 and further comprising: a decorative veneer layer having said first predetermined curvature pattern on said outer surface of said top panel; and a decorative veneer layer having said first predetermined curvature pattern on said outer surface of said bottom panel.

15. The arrangement defined in claim 11 wherein: said inner surface of said top panel is bonded to said upper surface of said intermediate panel.

16. The arrangement defined in claim 11 wherein: said inner surface of said bottom panel is bonded to said lower surface of said intermediate panel.

17. The arrangement defined in claim 11 wherein: said inner surface of said top panel is bonded to said upper surface of said intermediate panel; and, said inner surface of said bottom panel is bonded to said lower surface of said intermediate panel.

18. The arrangement defined in claim 11 wherein: the number of said first plurality of thin sheet laminate layers in said top panel is the same as the number of said second plurality of thin sheet laminate layers in said bottom panel.

19. The arrangement defined in claim 11 wherein: the number of said first plurality of thin sheet laminate layers in said top panel is the same as the number of said third plurality of thin sheet laminate layers in said intermediate panel.

* * * * *